(12) United States Patent  
Olson et al.

(10) Patent No.: US 7,991,423 B2
(45) Date of Patent: *Aug. 2, 2011

(54) WIRELESS DEVICE AUTHENTICATION AT MUTUAL REDUCED TRANSMIT POWER

(75) Inventors: Erlend Olson, Newport Beach, CA (US); Kenton C. Murphy, Los Gatos, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/776,660

(22) Filed: May 10, 2010

(65) Prior Publication Data

US 2010/0216504 A1    Aug. 26, 2010

Related U.S. Application Data

(63) Continuation of application No. 11/174,983, filed on Jul. 5, 2005, now Pat. No. 7,734,306, which is a continuation of application No. 10/060,975, filed on Jan. 30, 2002, now Pat. No. 6,928,295.

(60) Provisional application No. 60/264,993, filed on Jan. 30, 2001.

(51) Int. Cl.
*H04Q 7/20* (2006.01)

(52) U.S. Cl. ............... 455/522; 455/410; 455/435.1; 455/41.2; 455/41.3

(58) Field of Classification Search .......... 455/410, 455/411, 41.2, 41.3, 522
See application file for complete search history.

(56) References Cited

U.S. PATENT DOCUMENTS 6,928,295 B2 * 8/2005 Olson et al. ............... 455/522
7,734,306 B2 * 6/2010 Olson et al. ............... 455/522

* cited by examiner

*Primary Examiner* — Temica M Beamer
(74) *Attorney, Agent, or Firm* — Garlick Harrison & Markison; Bruce E. Garlick

(57) ABSTRACT

A system and method for facilitating the authentication of wireless devices in an environment with multiple wireless networks. A user wishing to join an operating wireless network can bring his wireless device within close physical proximity, for example, less than one meter, of a device in the network that he wishes to join. The user then presses an authenticate button, which causes both devices to enter a low transmission power mode. In such case, the devices are only capable of operation within the close proximity. Being in low power mode will diminish the possibility of eavesdropping on the authentication process. Power down mode also reduces the amount of message traffic in the area and saves scarce power and processing resources at the nodes, which are now out of range. Authentication then takes place in low power mode and once completed, both devices resume normal power levels and continue communicating normally.

20 Claims, 6 Drawing Sheets

WIRELESS DEVICE AUTHENTICATION AT MUTUAL REDUCED TRANSMIT POWER

CROSS REFERENCE TO PRIORITY APPLICATION

This application is a continuation of U.S. application Ser. No. 11/174,983, filed Jul. 5, 2005, which is a continuation of U.S. application Ser. No. 10/060,975, filed Jan. 30, 2002, now issued as U.S. Pat. No. 6,928,295, which claims priority to U.S. Provisional Patent Application No. 60/264,993 filed Jan. 30, 2001, all of which are incorporated herein by reference in their entirety.

FIELD OF THE INVENTION

The present invention relates to wireless communications; and more particularly to wireless network communications.

BACKGROUND OF THE INVENTION

The number and popularity of wireless communications devices in use continues to rise rapidly all over the world. Not only are mobile phones very popular, but there is also a demand for wireless networking devices. One standard for wireless networking, which has been widely accepted, is the Specification of the Bluetooth System, v. 1.0 ("Bluetooth Specification"). The Bluetooth Specification continues to evolve and subsequent versions are expected to be available.

The Bluetooth Specification enables the creation of small personal area networks (PAN's), where the typical operating range of a device is 100 meters or less. In a Bluetooth system, the wireless Bluetooth devices sharing a common channel form a piconet. Two or more piconets co-located in the same area, with or without inter-piconet communications, is known as a scatternet. It is anticipated that as piconets are setup there could be several piconets operating in the same area as a scatternet, but not necessarily linked together.

The need to have security procedures in wireless networks has led to security, encryption and authentication procedures and protocols being incorporated as part of the Bluetooth Specification, in Volume 1, part B, Section 14: Bluetooth Security, of the Specifications of the Bluetooth System, v. 1.0, as referenced above.

When a wireless Bluetooth device tries to connect to a particular piconet, it must go through an authentication process, where a user that is part of that piconet, allows the guest to join the piconet. Typical wireless network devices such as computers, personal digital assistants (PDAs) and mobile phones, have a display and a keyboard that facilitate the authentication process. When a user with a mobile phone enters into the operating range of a piconet, he will get a message telling what piconet, with a particular ID, he has just entered and he can signal his intention to join that piconet by pressing the appropriate key on his keypad. When he presses the appropriate key, he will start the process of joining that piconet.

When the guest entered into range of the piconet, his PIN was sent to and received by the devices in the piconet. His PIN can then be shown on the displays of the devices in the piconet. A user in the piconet can then respond to the guest's request and he can accept or deny the guest's request to join that piconet. Eavesdropping during the registration process makes Bluetooth devices particularly vulnerable to security breaches.

When a guest enters an area with several operating piconets, his display will show him the ID's of the piconets he has discovered. The guest can then choose which piconet to join using his keypad. But when the guest has a minimal user interface, such as a wireless headset, he has not ability to signal his choice of which piconet to join. In such case, the headset may be paired to work only with a paired device. This paired device may also have a limited user interface, and not have a display or keypad.

There is a need for a system, protocol and procedure to enable wireless devices, such as headsets, to join a particular piconet. There is also a need to improve security by reduce the possibility of eavesdropping on the authentication process. There is also a need to avoid burdening nearby nodes with the extra traffic caused by authentication.

SUMMARY OF THE INVENTION

Operation according to the present invention enables wireless devices to select and join a particular wireless network with minimal user interaction and with ease in selection of the network. According to the present invention, after selection of a network and request for admission to the network, reduced power operations are performed during corresponding authentication operations. Reduced power authentication operations ensure that admission to the selected network is attempted and not with a different network. Further, the reduced power operations minimize the ability of eavesdropping devices to intercept authentication information One technique for implementing these reduced power authentication operations is to first select a master device of the wireless network for the purpose of requesting a connection to the wireless network. With the master device selected, a user places the new device a distance from the master device of the wireless network. This reduced distance is substantially less than the maximum operating range of the devices. The new device then sends a message to the master device that requests that the new device join the wireless network. Upon receipt of this message, both the new device and the master device reduce their radio frequency power outputs to a power level sufficient to maintain radio communications between the devices at the reduced distance. The new device then processes the request, approves the request, and authenticates the new device into the wireless network. Once these operations are complete, the new device and the master device increase their radio frequency power outputs to normal power levels.

Using this operating technique, a user of a wireless device having a minimal (or no) user interface, e.g., a wireless headset, may easily select a particular network. With the master device and the new device reducing their transmit power during the joining operations, joining a desired network is substantially guaranteed. Further, with the reduced power operations of the present invention, minimal user input is required for the joining operations. Moreover, when multiple networks are present, e.g., a scatternet, the user of the new device may easily select a desired network from a plurality of networks having overlapping coverage area.

Other features and advantages of the present invention will become apparent from the following detailed description of the invention made with reference to the accompanying drawings.

DETAILED DESCRIPTION

Figure 1:
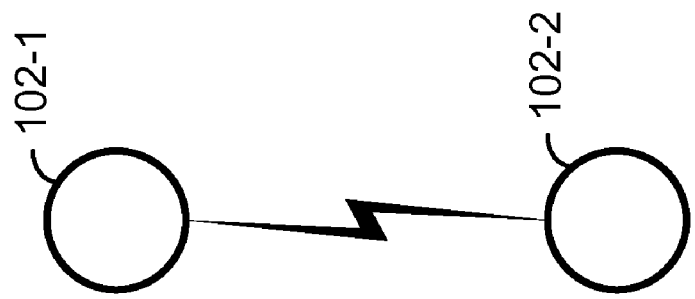
FIG. 1 illustrates in a block diagram, a point-to-point network between two wireless devices.

FIG. 1 illustrates a network 10 that includes two wireless devices 102-1 and 102-2. Network 10 is, for example, a wireless Bluetooth point-to-point piconet where wireless device 102-1 is a master Bluetooth system and wireless device 102-2 is a slave Bluetooth system, where the master 102-1 and slave 102-2 share the same channel. The point-to-point network 10 described with reference to FIG. 1 need not include Bluetooth devices 102-1, 102-2, but, rather, may comprise any type of wireless device. These wireless devices 102-1 and 102-2 may include digital computers, computer peripherals such as printers, scanners, mice, keyboards, etc., personal data assistants (PDAs), wireless telephones, wireless headsets, and other wireless devices.

Figure 2:
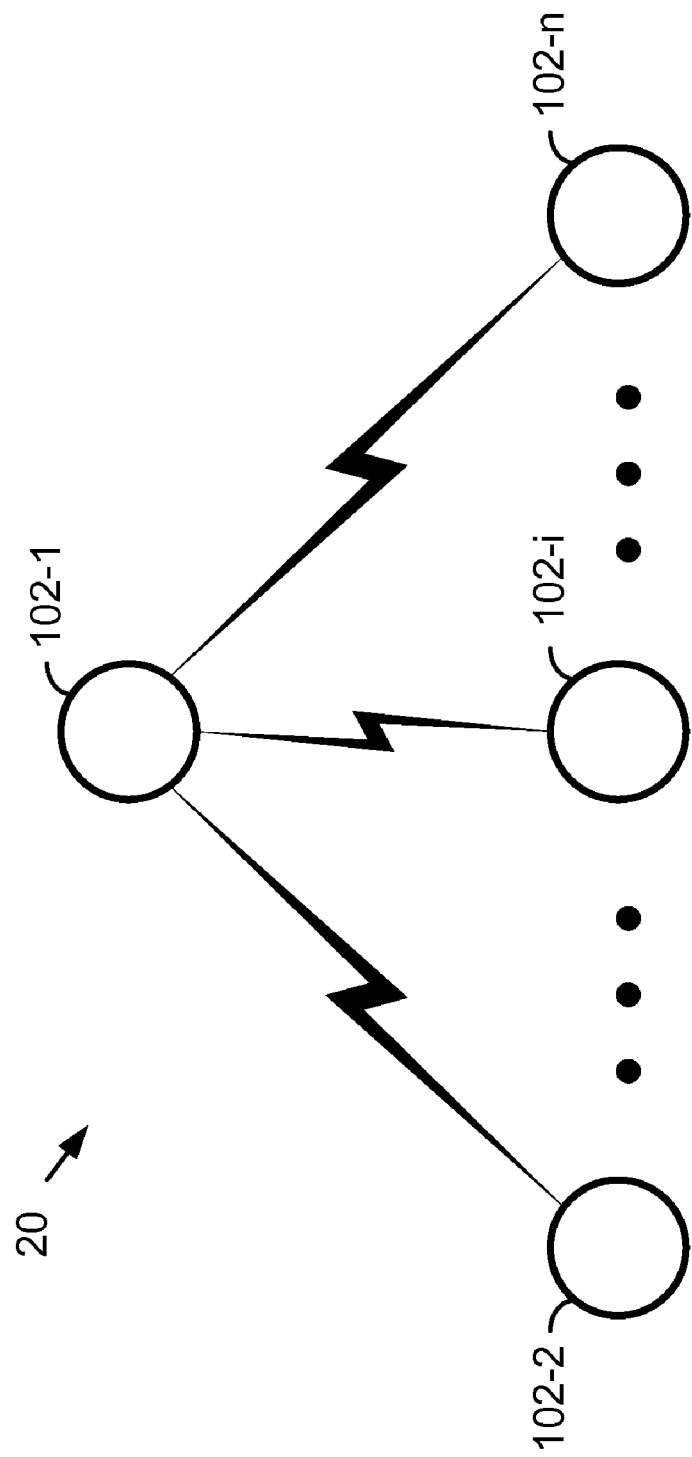
FIG. 2 illustrates in a block diagram, a point to multipoint network among a plurality of wireless devices.

FIG. 2 illustrates a network 20 that includes a plurality of wireless devices 102-1, 102-2 ... 102-$i$ ... 102-$n$ (2≦i≦n). Wireless network 20 is, for example, a point-to-multipoint Bluetooth piconet where wireless device 102-1 is a master Bluetooth system and wireless devices 102-2 through 102-$n$ are slave Bluetooth systems and communicate with the master Bluetooth system 102-1 over the same channel. In at least one embodiment, up to seven slaves can be active in the piconet 102. The number of active slaves supported in a piconet depends on many variables and design considerations. The point-to-point network of FIG. 2 need not include Bluetooth devices 102-1, 102-2, but, rather, may comprise any type of wireless device.

In addition to the active slaves 102-2, 102-$i$ through 102-$n$ illustrated in FIG. 2, a point-to-multipoint piconet 20 may include many additional slaves that can remain locked to the master 102-1 in a so-called "parked" state. When a slave does not need to participate on the piconet channel, but still needs to remain synchronized to the channel it can enter the parked state. These parked slaves cannot be active on the piconet channel, but still remain synchronized to the master.

For both active and parked slaves in a single piconet 20 (or piconet 10 of FIG. 1), the master 102-1 controls channel access. To this end, the master 102-1 switches control from one slave to another as it controls channel access within the piconet 20. The master 102-1 identifies each slave through a unique network address assigned to each slave. When a transfer of information between two slaves in a piconet 10 is desired, the master 102-1 coordinates point-to-point transmission between the two slaves.

Referring to FIG. 2, for instance, slave 102-2 could be a wireless personal digital assistant ("PDA") device equipped with a Bluetooth system and slave 102-$i$ could be a wireless cellular telephone equipped with a Bluetooth system. In such a case, the master 102-1 can coordinate communications between two slaves 102-2, 102-$i$ over the piconet channel to exchange, for instance, phone number information. To do so, the master 102-1 switches focus between the first slave 102-2, commanding it to transmit phone number data to the master 102-1, and the second slave 102-$i$, commanding it to receive phone number data from the master 102-1. This switch in focus is performed by the master through its storing and accessing context information regarding each slave in a relatively rapid succession.

Figure 3:
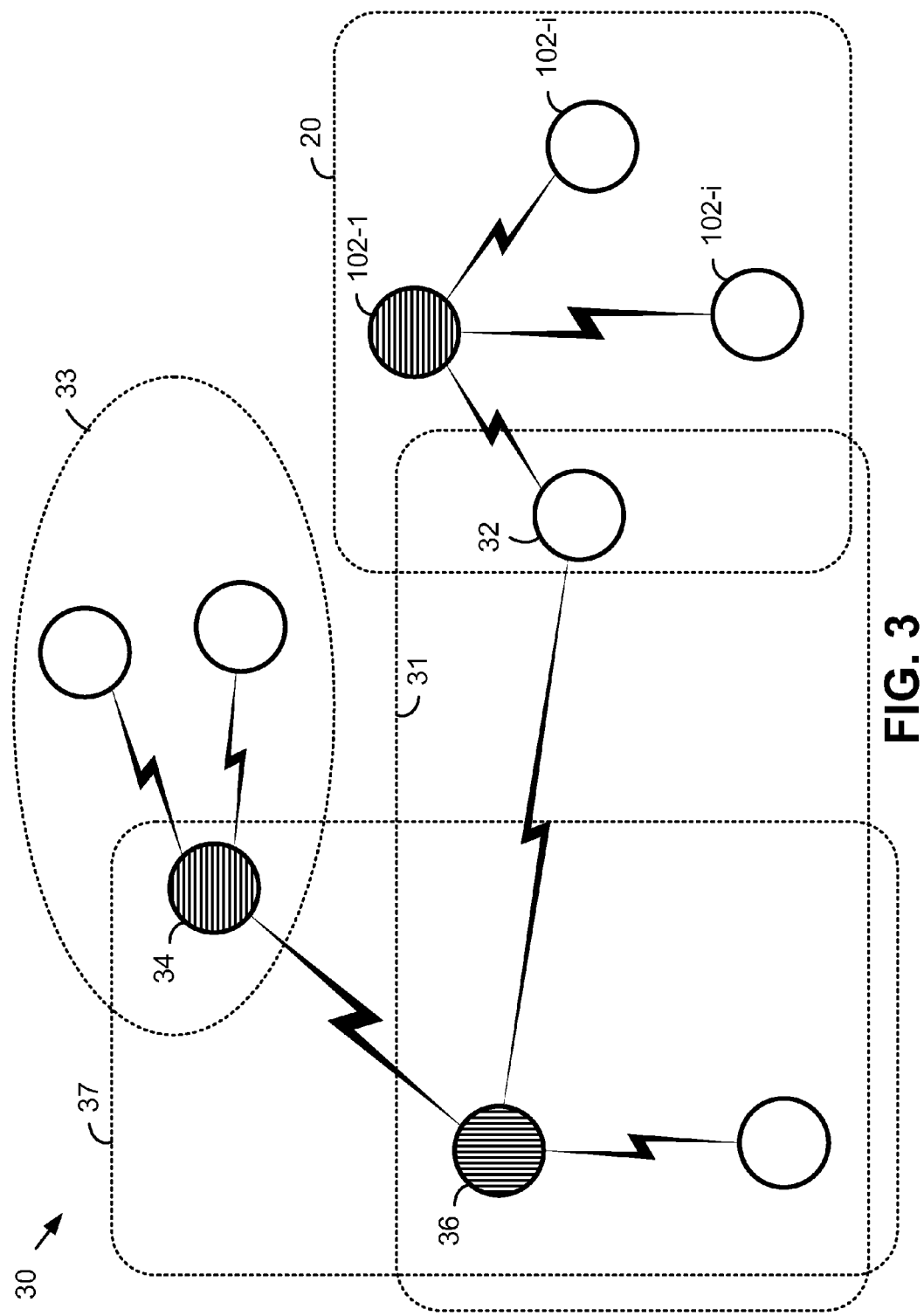
FIG. 3 illustrates in a block diagram, a scatternet that includes multiple piconets with overlapping coverage.

FIG. 3, illustrates, for instance, a "scatternet", formed from multiple piconets with overlapping coverage. Bluetooth piconets 20, 31, 33, and 37 form part of the larger Bluetooth scatternet 30. Each piconet 20, 31, 33, and 37 has only a single master 102-1, 36, 36, and 34 respectively. However, FIG. 3 also illustrates that slaves can participate in multiple piconets on a time-division multiplex basis. For instance, in FIG. 3, slave 32 participates in two piconets: piconet 20 having master 102-1 and piconet 31 having master 36. In addition, a master 34 in one piconet 33 can be a slave in another piconet 37. Further, a single Bluetooth system may serve as a master in two piconets, e.g., Bluetooth system 36 serves as a master in both piconet 31 and piconet 37.

Figure 4:
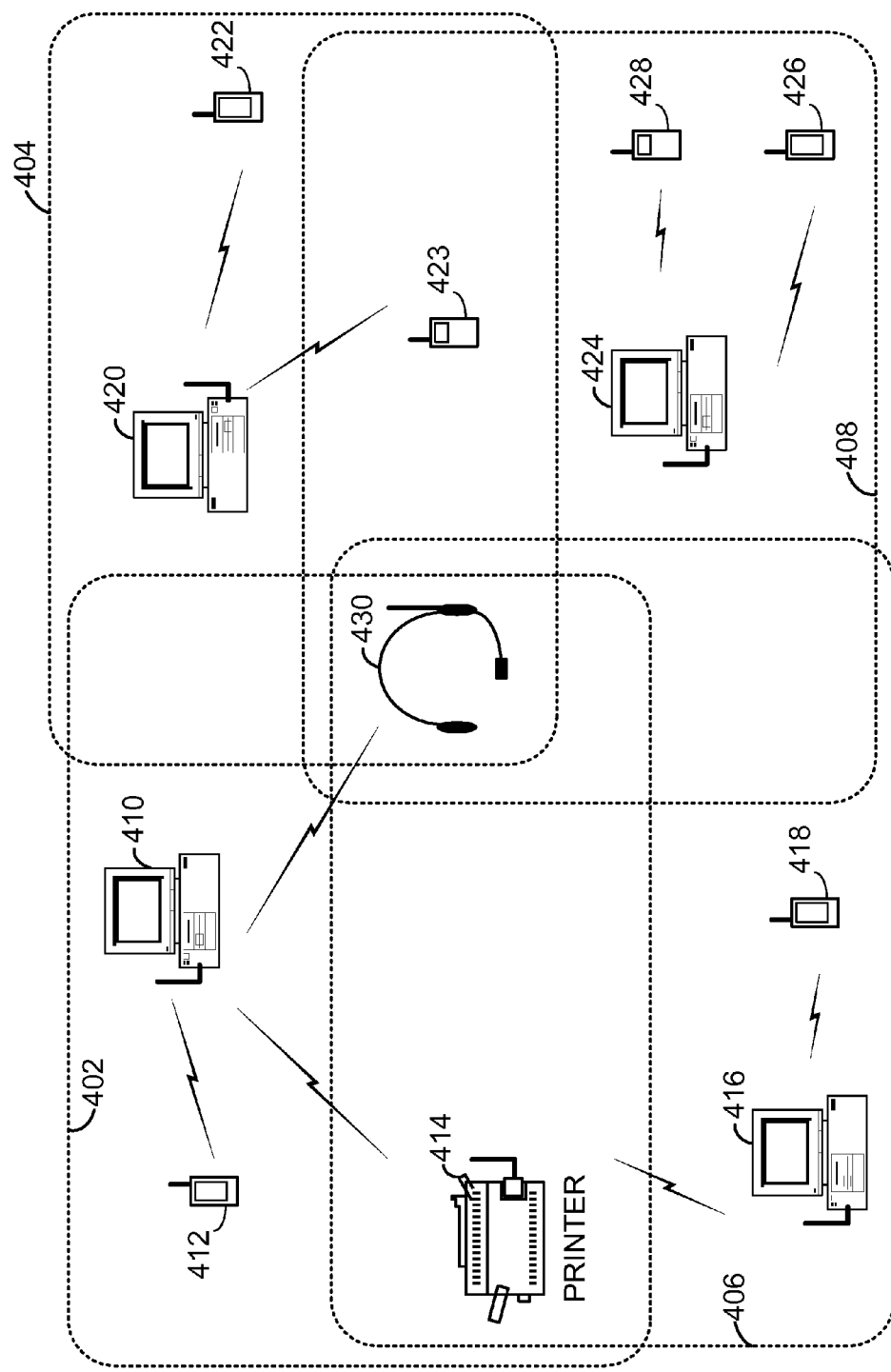
FIG. 4 is a system diagram illustrating a scatternet in which one operation according to the present invention is performed.

FIG. 4 is a system diagram illustrating a scatternet in which one operation according to the present invention is performed. The scatternet of FIG. 4 includes four separate piconets 402, 404, 406, and 408. Piconet 402 includes master (computer) 410, slave 412 (PDA), and slave 414 (printer). Piconet 404 includes master 420 (computer), slave 422 (PDA), and slave 423 (wireless phone). Piconet 406 includes master (computer) 416, slave 418 (PDA), and slave 414 (printer). Piconet 408 includes master (computer) 424, slave 426 (PDA), and slave 428 (wireless phone). The four separate piconets 402, 404, 406, and 408 have overlapping coverage areas. In the embodiment of FIG. 4, all masters are shown to be computers because they will typically be stationary and have the processing capability to service a number of slaves. However, in other embodiments, the masters could be other devices as well. The scatternet of FIG. 4 may service a call center, customer service department, or other office environment, for example that benefits by the wireless interconnection of the illustrated devices.

A user of wireless headset 430 desires to have the wireless headset 430 join piconet 402 (corresponding to his home computer). The wireless headset 430 has a minimal user interface, e.g., a single authenticate button that initiates joining of a piconet. However, the wireless headset 430, in its operating location, resides within the service coverage area of each of the four separate piconets 402, 404, 406, and 408 that form the scatternet. According to prior techniques, the user of the wireless headset 430 would have difficulty in selecting the desired piconet 402 because of the minimal user interface components of the wireless headset 430.

Thus, according to the present invention, when the wireless headset 430 enters (or powers up in) an area with more than one functioning piconet, the wireless headset 430 uses physical proximity, an authenticate button and a power down procedure to start the authentication process. The user of the wireless headset 430 physically approaches within close proximity, e.g., less than one meter, the master 410 servicing the piconet 402 that he wishes to join. Then, the user presses the authenticate button, signaling his intention to join the particular piconet 402.

Once the authenticate button has been pushed, both nodes, the master 410 and the slave 430 power down to a level that is usable within the one meter close proximity range. In the described embodiment, power down mode will work only if the distance between the devices is less than 1 meter. Power down mode increases the security of the authentication process, by minimizing message traffic, which could be received by other devices and other piconets. Power down mode increases the security of the authentication process, by preventing most other devices in the area from snooping or eavesdropping on the authentication process. Further, power down mode minimizes or eliminates any confusion regarding which piconet that the user wishes to join.

By minimizing air traffic during authentication, the other users and piconets have a better chance of maintaining stable communication. For example, if a piconet were hit with a lot of message traffic from users just walking by the piconet, scarce processing and power resources could be wasted in evaluating the new message traffic. This could bring regular traffic in the piconet to a standstill. Power down mode thus prevents the devices that are now out of range, from being disturbed by the authentication process.

In one operation of the present invention, the user on the piconet 402 that is within close proximity will get a message on the display of the master 410. The message would typically display the PIN of the guest 430 trying to join the piconet 402 along with a message stating his request to join. The user on the piconet 402 would then either allow or disallow the guest 430 attempting to join the piconet 420.

Authentication granted by the process could be temporary or permanent. When authentication is complete, then a confirming message can be sent to both devices. The wireless headset 430 user could receive a confirming tone to indicate completion of authentication. If authentication is not successful, that could also generate a message to one or both of the devices 410 and 430. Once authentication is complete, then normal power mode can be resumed and the guest (wireless headset 430) is now part of that piconet 402 and normal communications continue.

Figure 5:
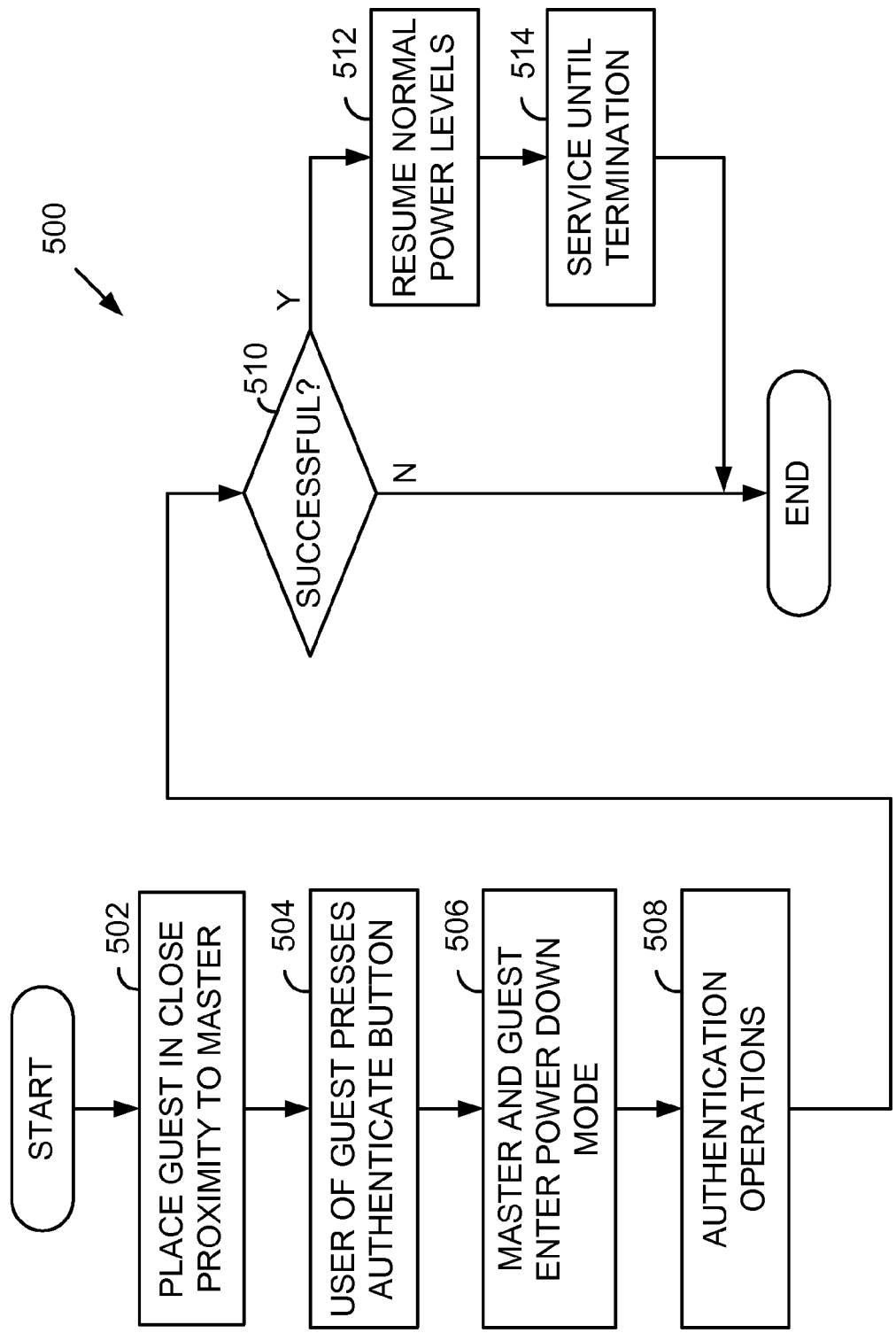
FIG. 5 is a logic diagram illustrating operation according to the present invention.

FIG. 5 is a logic diagram illustrating operation according to the present invention. The logical operations described with reference to FIG. 5 will include references to the devices of FIG. 4. Operation commences when a guest (wireless handset 430) is placed within close proximity of a master (computer 410), e.g., 1 meter (step 502). With the guest 430 in close proximity to the master 410, a user of the guest 430 presses an authenticate button to initiate the joining of a piconet 402 serviced by the master 410 (step 504). The master 410 and the guest 430 then enter a power down mode in which the transmit power of each device is reduced (step 506). The transmit power during the power down mode is such that devices outside of the proximate distance between the devices 410 and 430 cannot eaves drop upon the authentication operations unless they are also proximately located. Thus, during the power down mode operations, the guest 430 should not be proximately located to other master devices.

Authentication operations are then performed in the power down mode (step 508). If the authentication operations are successful (as determined at step 510), normal power operations are resumed (step 512) and wireless communication operations are serviced until completion (step 514) at which point operation ends. If the authentication operations are not successful (as determined at step 510), operations end. After a successful authentication operation, confirmation of such success may be communicated to the user of the guest 430, e.g., the delivery of a distinctive tone to the user of the wireless headset 430.

Figure 6:
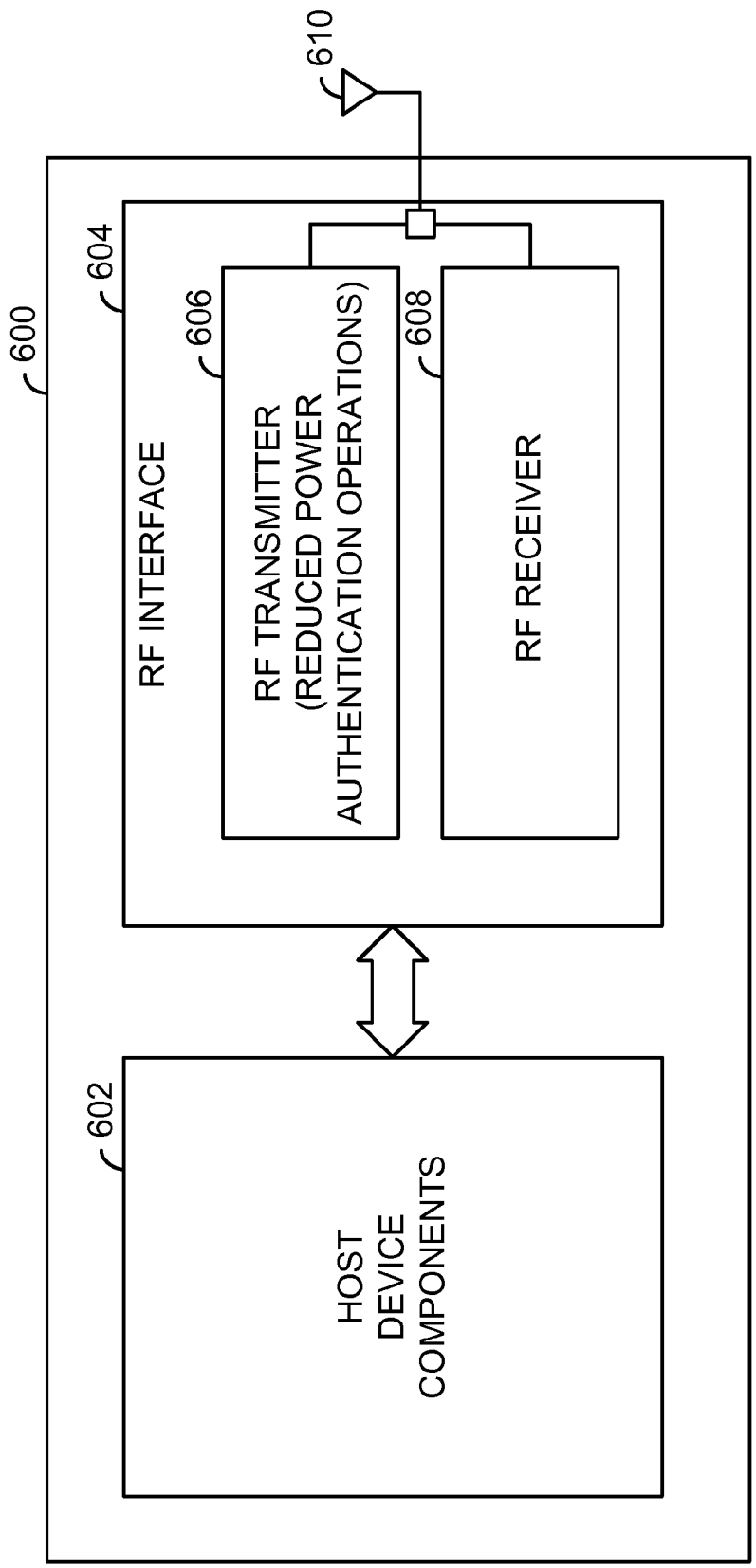
FIG. 6 is a block diagram generally illustrating the structure of a wireless device constructed according to the present invention.

FIG. 6 is a block diagram generally illustrating the structure of a wireless device constructed according to the present invention. The general structure of the wireless device 600 will be present in any of the wireless devices illustrated in FIGS. 1-4, either master devices or slave devices. The wireless device 600 of FIG. 6 implements the operations of FIG. 5. The wireless device 600 includes a plurality of host device components 602 that service all requirements of the wireless device 600 except for the wireless requirements of the wireless device 600. Of course, operations relating to the wireless communications of the wireless device 600 will be partially performed by the host device components 602.

Coupled to the host device components 602 is a Radio Frequency (RF) interface 604. The RF interface 604 services the wireless communications of the host device 600 and includes an RF transmitter 606 and an RF receiver 608. The RF transmitter 606 and the RF receiver 608 both couple to an antenna 610. The teachings of the present invention are embodied within the RF transmitter 606 of the RF interface 604 and are generally referred to as reduced power authentication operations. During these operations, the transmit power of the RF transmitter 606 is reduced to effectively reduce the operating range of the RF interface 604. During these reduced power operations, the operations of the RF receiver 608 may remain unchanged.

The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

The invention claimed is:

1. A method for operating a master wireless device of a Wireless Personal Area Network (WPAN) comprising:
   wirelessly receiving a request from a new wireless device to join the WPAN;
   wirelessly transmitting WPAN authentication information to the new wireless device at a reduced transmit power level that is less than a normal transmit power level; and
   during an interval of time when wirelessly transmitting WPAN authentication information to the new wireless device at the reduced transmit power level, wirelessly transmitting packet data to at least one slave wireless device on an interspersed basis at the normal transmit power level.

2. The method of claim 1, further comprising:
   wirelessly transmitting packet data to the new wireless device at the normal transmit power level after the new wireless device has joined the WPAN.

3. The method of claim 1, wherein the master wireless device and the new wireless device are operable to wirelessly communicate the WPAN authentication information when located a proximate distance from one another, the proximate distance substantially less than a maximum supported operating range of the wireless devices.

4. The method of claim 1, further comprising:
   wirelessly receiving a request from the new wireless device to join the WPAN; and
   wirelessly transmitting to the new wireless device a direction to enter reduced power authentication operations.

5. The method of claim 1, further comprising wirelessly transmitting at the reduced transmit power level to the new wireless device a direction to enter reduced power authentication operations.

6. The method of claim 1, wherein:
   another WPAN provides overlapping coverage with the WPAN; and
   wirelessly transmitting the WPAN authentication information to the new wireless device at the reduced transmit power level prevents members of the another WPAN from receiving the WPAN authentication information.

7. The method of claim 6, wherein:
   the WPAN is a piconet;
   the another WPAN is a piconet; and
   the WPAN and the another WPAN form a scatternet.

8. The method of claim 1, wherein the WPAN operates according to one or more versions of the Bluetooth Specification.

9. The method of claim 1, further comprising broadcasting WPAN information at the reduced transmit power level.

10. A Wireless Personal Area Network (WPAN) device comprising:
   host device components; and
   a Radio Frequency (RF) interface communicatively coupled to the host device components;
   wherein the WPAN device is operable to:
      establish a WPAN by acting as a master wireless device;
      wirelessly receive a request from a new wireless device to join the WPAN;
      wirelessly transmit WPAN authentication information to the new wireless device at a reduced transmit power level that is less than a normal transmit power level; and
      during an interval of time when wirelessly transmitting WPAN authentication information to the new wireless device at the reduced transmit power level, wirelessly transmit packet data to at least one slave wireless device on an interspersed basis at the normal transmit power level.

11. The WPAN device of claim 10, wherein the WPAN device is further operable to wirelessly transmit packet data to the new wireless device at the normal transmit power level after the new wireless device has joined the WPAN.

12. The WPAN device of claim 10, wherein, the WPAN device and the new wireless device are operable to wirelessly communicate the WPAN authentication information when located a proximate distance from one another, the proximate distance substantially less than a maximum supported operating range of the wireless devices.

13. The WPAN device of claim 10, wherein the WPAN device is further operable to:
   wirelessly receive a request from the new wireless device to join the WPAN; and
   wirelessly transmit to the new wireless device a direction to enter reduced power authentication operations.

14. The WPAN device of claim 10, wherein the WPAN device is further operable to transmit to the new wireless device a direction to enter reduced power authentication operations by transmitting at the reduced transmit power level.

15. The WPAN device of claim 10, wherein:
   another WPAN provides overlapping coverage with the WPAN; and
   wirelessly transmitting the WPAN authentication information to the new wireless device at the reduced transmit power level prevents members of the another WPAN from receiving the WPAN authentication information.

16. The WPAN device of claim 15, wherein:
   the WPAN is a piconet;
   the another WPAN is a piconet; and
   the WPAN and the another WPAN form a scatternet.

17. The WPAN device of claim 10, wherein the WPAN operates according to one or more versions of the Bluetooth Specification.

18. The WPAN device of claim 10, wherein the WPAN device is further operable to broadcast WPAN information at the reduced transmit power level.

19. A method for operating a Wireless Personal Area Network (WPAN) device comprising:
   establishing a first WPAN;
   establishing a second PAN;
   wirelessly receiving a request from a new wireless device to join the first WPAN;
   wirelessly transmitting first WPAN authentication information to the new wireless device at a reduced transmit power level that is less than a normal transmit power level; and
   during an interval of time when wirelessly transmitting first WPAN authentication information to the new wireless device at the reduced transmit power level, wirelessly transmitting second WPAN packet data to at least one slave wireless device of the second WPAN on an interspersed basis at the normal transmit power level.

20. The method of claim 19, further comprising wirelessly broadcasting at least one of first WPAN information and second WPAN information at the reduced transmit power level.

* * * * *